Patented Jan. 12, 1954

2,665,988

UNITED STATES PATENT OFFICE 2,665,988

FOOD FLAVORING

Merton A. Searle, Lincoln, Nebr.

No Drawing. Application April 30, 1951,
Serial No. 223,831

7 Claims. (Cl. 99—16)

This invention relates to an improvement in food flavoring material and deals particularly with coated monosodium glutamate.

In the past few years, considerable effort has been made to produce monosodium glutamate and to test this composition and its effect upon various foods. Authorities state that this compound is particularly useful in enhancing the flavor of various foods, including meats, vegetables, soups, fish and other miscellaneous food products. While the material adds no particular flavor or color of its own, it appears to enhance the natural flavor of the foods with which it is used.

An object of the present invention lies in the provision of a coating for the granules of monosodium glutamate which adds materially to the advantages and uses of this material. The coating which I prefer to employ comprises vitamin $B_1$, vitamin $B_2$, vitamin C and vitamin $B_{12}$, either singly or in combination. This coating has numerous advantages which render the product advantageous.

A feature of the present invention lies in the provision of crystals of monosodium glutamate coated with certain vitamins or mixtures thereof. The vitamins are ground to a particular size which is extremely small as compared to the crystals of monosodium glutamate and the crystals act as a carrier for the vitamin salts which otherwise would separate from the mixture. Where the particles of vitamins are ground to the same size as the crystals, there appears to be no adherence of the materials and the vitamins and crystals gradually stratify upon handling. However, where the vitamins are in powder form and the particles are much smaller than the crystals, the powder adheres to the surface of the crystals and forms a coating thereupon. Finally the crystals act as a carrier for the vitamins.

The use of vitamins coated on the crystals have several important advantages. In the first place any tendency for the crystals to adhere or cake together is prevented due to the spacing of the crystals by the vitamin coating. Secondly the vitamins appear to protect the crystals and to prevent loss thereof when open to atmosphere, the coating assisting in retaining the flavor of the crystals. Furthermore, the vitamin coating actually enhances the flavor of the food in some manner when combined with the monosodium glutamate. The vitamins alone do not appear to better the flavor of a food product in which they are used and actually tend to detract from the flavor. On the other hand, when used in combination they appear to increase the flavor of the foodstuff in which they are placed better than either product alone. Finally the vitamin coating appears to, in some way, cause retention of the enhanced flavor over a greater length of time. It is not fully known whether this result is due to the fact that the vitamin coating delays or prolongs the action of the monosodium glutamate upon the product or whether the result is due to some chemical action between the elements. However, in any event food containing particles of vitamin coated monosodium glutamate appear to retain their enhanced flavor over longer periods of time than similar foods treated with uncoated monosodium glutamate.

These and other objects and novel features of my invention will be more clearly and fully set forth in the following specification and claims.

The present invention comprises a method of producing monosodium glutamate coated with one or a mixture of vitamins in powdered form. The vitamins which are employed comprise vitamin $B_1$, vitamin $B_2$, vitamin C and vitamin $B_{12}$, either singly or in combination.

In producing the product, monosodium glutamate is formed in one of several ways. For example, this compound may be produced from sugar beets which in their natural state contain glutamine. In the production of monosodium glutamate, the beets are processed to produce a raw juice which contains the elements necessary in the production of sugar and molasses. The glutamine is also contained in the raw sugar juice. During the diffusion step, glutamine passes into the raw juice without decomposition. The juice is then ordinarily made alkaline with lime. During this process the glutamine changes to pyrrolidone carboxylic acid which is the internal anhydride of glutamic acid. Equilibrium is such that in any aqueous solution of either glutamic acid or pyrrolidone carboxylic acid, both are present.

The juice forms sugar and molasses in the manner well known in the art. Most of the glutamic acid is contained in the molasses as pyrrolidone carboxylic acid. The molasses is then de-sugared by the Steffans process. During this process the molasses is diluted with water to about five percent to six percent sugar. It is treated with freshly burned or freshly ground lime. The calcium combines with the sugar to form calcium saccharate which is relatively insoluble. The solution is then put through a filter press which removes a large part of the sugar. The filtrate may then be further treated to obtain monosodium glutamate. However, if there is a delay in the process the filtrate is preferably concentrated in order to prevent bacterial spoilage.

This filtrate is next carbonated with lime kiln gases. The calcium carbonate thus formed is removed by settling and filtration. The filtrate is next concentrated in evaporators and brought to a uniform density. It is next hydrolized in steel hydrolyzers with a fifty percent solution of caustic soda. The hydrolized liquor is cooled and acidified with hydrochloric acid. This acidified liquid is further concentrated under high vacuum in an evaporating system. Certain of the unorganic salts, such as potassium chloride and sodium chloride are precipitated and removed by means of centrifugal filters. The filtrate is adjusted to the proper pH and the highly acid liquor is cooled by suitable refrigerating means. The filtrate is then run into crystallizers. After five days glutamic acid crystals and some sodium chloride have been formed.

The filtrate is passed into thickeners and solid crystals removed. The glutamic acid crystals are dissolved in caustic soda and the resulting liquid decolored with activated carbon. It is again concentrated in a boiling pan and monosodium glutamate crystals are formed in crystallizers. These crystals are separated in a centrifuge and dried.

The monosodium glutamate thus formed is next coated with a vitamin coating. In the coating operation the vitamins are ground to a particle size which is extremely small relative to the crystals of monosodium glutamate. For example, the particles of powder may be of a size from $\frac{1}{100}$ to $\frac{1}{50}$ the size of the average crystal. The vitamin and the monosodium glutamate are placed in a mixing vat or drum and are thoroughly intermixed. During this operation the relatively small particles of the vitamins adhere to the surface of the crystals and act as a coating thereupon. After the mixing process there is no excess or free vitamin powder remaining in the mixture, or of the powder being attached to the crystals.

This arrangement has several advantages. In the first place the crystals act as a carrier for the vitamin particles and insure the proper percentage of vitamins in the finished product. In other words, each gram of the finished product has very close to the same amount of vitamins and the same proportion of vitamins and crystals.

In the second place this arrangement is advantageous as the two substances combining together appear to enhance the flavor of food better than either compound singly. Neither the vitamins nor the monosodium glutamate are particularly palatable by themselves. However, in tests it appears that the two substances when combined enhance the flavor of a food treated better than either product alone. The actual taste of the vitamins in some way blends with the food product so that even when a relatively high percentage of vitamins are employed, the flavor of the vitamins can not be discovered.

It has also been found that the vitamin coating on the crystals tends to maintain each crystal separate from the others and prevents caking or adhering of the crystals together in damp weather or humid conditions. While vitamin powder itself may be caked together to form a tablet, the coating of this material on the crystals seems to prevent the crystals from contacting and therefore each crystal breaks cleanly away from the others upon agitation. This is of importance from a physical standpoint where the monosodium glutamate is used for seasoning food.

The vitamin coating on the crystals also has a tendency to prolong the effectiveness of the crystals. The coating seems to seal in the flavor and prevents the crystals from changing in flavor over relatively long periods of time. Furthermore, the coating appears to prolong the taste enhancing effect of the monosodium glutamate over longer periods of time.

As specific examples of proportions which may be employed vitamin $B_1$ may be mixed with monosodium glutamate in the proportion of one pound of vitamin $B_1$ to three thousand pounds of monosodium glutamate. The extremely small particle size of the vitamin $B_1$ permits each crystal of monosodium glutamate to be coated.

If the vitamin employed is vitamin $B_2$, about one and one-half pounds of vitamin $B_2$ should be mixed with three thousand pounds of monosodium glutamate. In the case of vitamin C, about ten pounds thereof should be mixed with three thousand pounds of monosodium glutamate. The amount of vitamin $B_{12}$ employed may be substantially varied, this substance being used in the proportion of one pound to ten pounds vitamin $B_{12}$ to three thousand pounds of monosodium glutamate.

As one specific example of my product, monosodium glutamate may be mixed in the above listed proportion with any single vitamin specified above. As another specific example any two of the above mentioned vitamins may be mixed in the specified proportion with monosodium glutamate. As another specific example, any three of the above mentioned vitamins may be combined in substantially the above proportion with monosodium glutamate. As a fourth example, all four of the above listed vitamins may be combined with monosodium glutamate in the listed proportions. As additional examples, the proportion of vitamins in the composition may be varied from one-fourth of the specified proportion to four times the specified proportions.

The color of the resulting product depends upon the particular vitamins employed. Vitamins $B_1$ and $B_2$ produce a yellow color in the product, while vitamin $B_{12}$ produces a pink colored coating. Combinations of these vitamins produce intermediate colors.

In accordance with the patent statutes, I have described the principles of composition and use of my food flavoring material, and while I have endeavored to set forth the best embodiment thereof, I desire to have it understood that obvious changes may be made within the scope of the following claims without departing from the spirit of my invention.

I claim:

1. As a new product monosodium glutamate in crystal form, said monosodium glutamate having each crystal uniformly coated with a powdered vitamin selected from the class consisting of vitamin $B_1$, vitamin $B_2$, vitamin C, and vitamin $B_{12}$, and mixtures thereof, the particles of said powdered vitamins being small relative to the crystals of the monosodium glutamate.

2. A product in accordance with claim 1 in which the vitamin is $B_1$.

3. A product in accordance with claim 1 in which the vitamin is $B_2$.

4. A product in accordance with claim 1 in which the vitamin is vitamin C.

5. A product is accordance with claim 1 in which the vitamin is $B_{12}$.

6. A product in accordance with claim 1 in which the vitamin is a mixture of $B_1$ and $B_2$.

7. As a new product, monosodium glutamate in crystalline form, said monosodium glutamate having a surface of each crystal uniformly coated with a powdered vitamin.

MERTON A. SEARLE.

References Cited in the file of this patent

UNITED STATES PATENTS

| Number | Name | Date |
| --- | --- | --- |
| 2,550,726 | Searle | May 1, 1951 |

OTHER REFERENCES

"Monosodium Glutamate as a Chemical Condiment," by John Han, Industrial and Engineering Chemistry, vol. 21, No. 10, October, 1929, pages 984–987.